ated Patent [19]

United States Patent [19]
Salome

[11] Patent Number: 4,531,975
[45] Date of Patent: Jul. 30, 1985

[54] ANTI-FOULING COMPOSITIONS

[75] Inventor: Frederik Salome, Sydney, Australia

[73] Assignee: Berger, Jenson & Nicholson, Limited, London, England

[21] Appl. No.: 573,597

[22] Filed: Jan. 25, 1984

Related U.S. Application Data

[63] Continuation of Ser. No. 382,361, May 26, 1982, abandoned.

[30] Foreign Application Priority Data

May 29, 1981 [AU] Australia ............................. PE9095

[51] Int. Cl.³ ................................................ C09D 5/14
[52] U.S. Cl. .................................. 106/18.3; 106/15.05; 106/16; 524/404
[58] Field of Search ...................... 106/15.05, 16, 18.3; 524/404

[56] References Cited

U.S. PATENT DOCUMENTS

| | | | |
|---|---|---|---|
| 3,851,053 | 11/1974 | Cardarelli | 424/78 |
| 3,928,564 | 12/1975 | Cardarelli | 424/78 |
| 4,115,130 | 9/1978 | Crump et al. | 106/18 |
| 4,171,228 | 10/1979 | Lowrey | 106/288 B |
| 4,229,329 | 10/1980 | Bennett | 106/DIG. 1 |
| 4,297,137 | 10/1981 | Sachetto et al. | 106/15.05 |
| 4,352,856 | 10/1982 | Smillie | 106/DIG. 1 |

FOREIGN PATENT DOCUMENTS

| | | | |
|---|---|---|---|
| 682432 | 11/1952 | United Kingdom | 106/DIG. 1 |
| 1457590 | 12/1976 | United Kingdom | . |

*Primary Examiner*—Lorenzo B. Hayes
*Attorney, Agent, or Firm*—Wenderoth, Lind & Ponack

[57] ABSTRACT

Marine anti-fouling compositions contain, in addition to the conventional resin, toxin, solvent, pigment and other additives, hollow particles, of size from 1 to 800 microns, in an amount to give a particle concentration in a dry paint film of 10 to 80% by volume. The hollow particles are preferably hollow microspheres or microballoons of glass or plastics material having an apparent bulk density of from 0.03 to 0.5 g/cc. The compositions can be applied at high film thicknesses in a single coat without crack-formation. The particles assist in maintaining a controlled slow release of toxin from the paint film, and can enhance the useful protective life thereof.

9 Claims, No Drawings

ANTI-FOULING COMPOSITIONS

This application is a continuation, of now abandoned application Ser. No. 382,361, filed May 26, 1982.

Anti-fouling compositions are paints applied to the underwater areas of ships in order to prevent growth of marine organisms, which, due to their weight and the roughness they impart to a surface, have a very significant influence on the speed and fuel consumption of a vessel. Anti-fouling coatings do not contribute significantly to the protection of a hull against corrosion, and therefore they are applied as a topcoat over a suitable priming system. They prevent marine growth by releasing into the seawater substances toxic to the settling-phases of marine growth, or to the adult organism, thus preventing attachment and growth of fouling organisms. The paint remains active while it can release toxins at a rate sufficient to maintain the necessary concentration of toxin in the thin layer of water immediately next to the hull. The necessary release rate depends on the toxin employed. Copper is commonly incorporated into anti-fouling compositions as cuprous oxide, and a leaching rate of 10 micrograms/cm$^2$/day of copper ions into the seawater is regarded as sufficient to prevent most fouling. Tributyl tin oxide (TBTO) is also a common anti-fouling toxin, and a release rate of 1 microgram/cm$^2$/day of tin is generally seen as satisfactory. As an anti-fouling paint ages in service the remaining toxin content diminishes until the release rate falls to such a level that marine growth is no longer deterred, that is, it is no longer active. The active life of a particular anti-fouling paint can often be increased by increasing the thickness of the coating applied. Also, toxin release rates are affected by speed of vessel as well as by the temperature, salinity and alkalinity of the seawater, which vary, from one geographical region to the next and with the seasons, and the weather.

If a hull is left untreated after its anti-fouling coating becomes inactive, operating costs for the vessel start to increase, and before long the vessel becomes uneconomical to run. Normally a vessel is dry-docked before such a state is reached, and another coat of anti-fouling paint is applied. The cost of a dry-docking is significant and a shipowner or operator will normally want to prolong the interval between dockings. Both time spent in dry-dock and labour costs contribute heavily to the total expense incurred during a dry-docking; time depends on the number of coats of paint applied and the recoat intervals and dry-time before launching, while labour costs are directly related to the number of coats applied. It therefore is desirable to apply the required thickness of anti-fouling paint in as few coats as possible.

Anti-fouling compositions in use today fall into a number of categories. These classes are well-known to people skilled in the art.

The oldest group of anti-fouling coatings is commonly known as the soluble matrix type of anti-fouling coating. The toxin is distributed in a matrix, or binder, which is slightly soluble in seawater. In service, the binder slowly dissolves, thus exposing toxin particles to the seawater. These coatings are usually based on rosin, normally plasticised. They are a soft coating. A principal disadvantage is that they perform poorly if exposed to the atmosphere for any significant period of time, particularly in strong sunlight—under these conditions they craze and crack rather badly.

Contact anti-fouling coatings, the second category, are high-toxin content coatings. The matrix commonly, although not always, consists of some soluble binder, normally rosin, in combination with an insoluble resin system, such as a plasticised chlorinated rubber or vinyl resin. Toxins used are commonly cuprous oxide or organotin compounds. A common problem encountered in chlorinated rubber anti-fouling coatings of this type is checking, a problem that is aggravated by excessive thickness or prolonged atmospheric exposure.

Over the last few years, a newer type of anti-fouling coating commonly referred to as erodable anti-fouling compositions, has been developed. In these coatings, the toxin, normally a tri-alkyl tin moiety, is chemically bonded to the polymer that is used as binder. This bonding is normally effected by an ester linkage. On contact with seawater, this linkage reacts with water (i.e. it hydrolyses.) liberating the toxic tin compound and leaving a carboxylic acid function on the polymer. As the film itself is more or less insoluble, hydrolysis only occurs at the interface with the seawater. The residual carboxy-functional polymer is more hydrophillic in nature and is thus readily swollen by water and is easily removed by the action of water moving past a ship's hull, thus exposing fresh anti-fouling paint underneath. These coatings, in order to provide long service, need to be applied at high film thickness. Normally three or four coats need to be applied to obtain the build-up desired, as too thick a wet film will tend to sag or run off a vertical surface such as the side of a ship.

The invention provides an anti-fouling composition containing, in addition to resin, toxin, solvent, and optionally pigment and other usual additives, hollow particles, of size from 1 to 800 microns, and present in an amount to give a particle concentration in a dry film formed from the composition of from 10% to 80% by volume.

The anti-fouling compositions of this invention include all the categories noted above. They can be applied at film thicknesses of 300 micrometers or more, in one coat, and the coatings do not suffer from the drawbacks commonly experienced by such coatings, especially at high film builds. In particular, their resistance to checking, cracking and crazing, both under immersed and atmospheric conditions, shows a marked improvement over the original paint. A particular problem with many conventional anti-fouling paints when applied at high builds is the long period required to obtain satisfactory through dry. This problem is substantially alleviated by compositions of the present invention containing an appropriate level of hollow particles. Additionally the anti-fouling compositions of this invention result in a more efficient utilisation of the often expensive toxins employed.

The hollow particles are preferably hollow microspheres or microballoons. They may suitably be of glass or organic polymer, or of some other material which is inert to the remaining ingredients. In principle, the hollows may be open or closed; in practice, it is found that most commercially available microballoons are porous to some extent. Porous particles may releasably absorb some of the liquid components of the composition, and this may enhance the slow toxin release properties as described below. However, particles having internal pore structures lack features of hollow particles, particularly hollow microspheres or microballoons, and are not included within the scope of this invention.

Preferably, hollow particles are used having a range of sizes, as this can improve packing density. In certain circumstances, it may be advantageous to use particles of uniform size as to have a lower packing density, as described below. A preferred range of particle sizes is from 5 microns to 300 microns. Three commercially available materials are, for example, suitable :

(i) Sodium borosilicate hollow microspheres sold by the Philadelphia Quartz Corporation under the Trade Mark Q-Cells. These have a density (by liquid displacement) of approximately 0.2 g/cc. One grade has a particle size range from 10–200 microns. Another grade has a particle size range from 5–100 microns. These have an excess of alkaline materials, and are thus water sensitive. A layer placed on water sinks after about 48 hours.

(ii) Hollow glass spheres sold by 3M Corporation, having a density (by liquid displacement) of approximately 0.2 g/cc and a particle size range of 10–100 microns. Unlike Q-Cells, these particles are chemically inert. A layer placed on water never completely sinks.

(iii) Hollow phenolic resin particles sold by Union Carbide Corporation under the Trade Mark Microballoons BJO-0930, having a density (by liquid displacement) of 0.21–0.25 g/cc and a particle size range of 5–125 microns. A layer placed on water sinks in a little over 24 hours.

These hollow particles provide bulk without weight, and are valuable for this reason in the production of coatings of high thickness in a single application. The hollow particles preferably have an apparent bulk density of from 0.03 to 0.5 g/cc, particularly from 0.05 to 0.2 g/cc.

The hollow particles are preferably used in an amount of from 25% by volume on the volume of a dry film prepared from the composition, up to the amount (the critical particle volume concentration) where they are in contact in the dry film with the interstices just filled with the remaining ingredients of the composition. In certain circumstances, as noted below, it may be useful to use more than the critical volume concentration of the particles.

The hollow particles are preferably substantially rigid, glass particles being preferred for this reason. There appears to be some correlation between the rigidity of the particles and their ability to reduce or eliminate cracking or crazing of paint films formed using the compositions. Non-rigid particles of comparable size and weight, are less effective for this purpose.

The remainder of the compositions of this invention may be conventional. Indeed, the compositions may be prepared simply by stirring hollow particles into a conventional anti-fouling paint.

French Patent Specification No. 2306246 (Corona) describes paints containing hollow beads having a density of 0.15–0.5 g/cc and a particle size of 5–50 microns. The beads perform a mechanical role which enables coatings 150–200 microns thick to be formed in a single application, where two applications were necessary previously. Anti-fouling paints are not mentioned.

U.S. Pat. No. 4,171,228 similarly describes high-build paints having two pigment components, of which one has a particle size from 44–325 microns and may be composed of hollow or cellular microspheres, and the other has a particle size from 0.5–20 microns. Again, marine anti-fouling paints are not mentioned.

With most paints, such as those with which the above French and U.S. Patent Specifications are concerned, the protective and decorative properties of the applied paint film are of paramount importance. Marine anti-fouling paints are peculiar in that these properties are not paramount. The most important single requirement is the controlled slow release of toxin from the applied paint film. It was not possible to predict how the use of hollow particles would affect the release of toxin. Applicants have surprisingly found that hollow particles can maintain, and even in many cases improve, this controlled slow release of toxin.

U.S. Pat. Nos. 3,851,053 and 3,928,564 (Goodrich) describe essentially solid vulcanisable elastomer compositions, in which microballoons are used as reservoirs to introduce more toxin than will dissolve in the elastomer. Such compositions are applied to substrates in the form of moulded sheets, which can be as thick as desired. Moreover, in the liquid paint compositions with which the present invention is concerned, there is no difficulty about incorporating as much toxin as is desired.

It is generally agreed in the industry that with most anti-fouling compositions currently available, a very high concentration of toxin is needed in the dry film to maintain a sufficiently high toxin release rate for a sufficiently long time. This is thought to be because the toxin has to diffuse through the film to the water/paint interface before it can react with sea-water and thus dissolve. The diffusion rate falls off logarithmically with distance (and film thickness). This means that when the toxin release rate falls below the threshold for growth prevention, there is still a substantial amount of toxin remaining in the film; the thicker the film the more toxin is left unutilised.

It is thought that when the anti-fouling compositions of this invention are immersed in sea-water, water permeates into the film (at a significantly greater rate than found in conventional anti-fouling compositions)and thus allows the toxins to dissolve to some degree. This dissolving of toxin forms a saturated aqueous phase within the film, and associated with the hollow particles. This aqueous phase is effectively trapped and thus the toxin is not lost by intermixing of the absorbed water with the ocean in general. Release of toxin to the layer of sea-water immediately adjacent to the film proceeds only by diffusion of ions from this saturated aqueous phase trapped inside the film. This diffusion, if not too rapid, will proceed at a steady rate, the loss due to diffusion being made up by more dissolution. As the aqueous component extends throughout the whole film, all of the toxin is eventually utilised and released at a steady rate.

The degree by which water permeates into the film, and the rate at which it does so, depends on the type and amount of particle used. For instance, water absorption rates (determined by weight, increase of a paint film after immersion) show that while a conventional resin-modified chlorinated rubber anti-fouling composition absorbs a maximum of about 8% by weight, the same composition with 10% V/V of Q-cells absorbs about 12% by weight and the same composition with 50% V/V of Q-cells absorbs about 25% by weight. Times to maximum absorption of water are 28 days for the composition containing no Q-cells, 14 days for the composition containing 10% V/V Q-cells, and 7 days for the composition containing 50% V/V Q-cells. A film of the same anti-fouling composition containing 50% V/V of the MMM hollow glass spheres (category (ii) above) absorbed 12% by weight of water, while a film containing 50% V/V of the microballoons (category (iii) above) absorbed 32%.

These figures correlate with the water absorption characteristics observed when the different hollow particles are applied on their own to the surface of water. Thus, the choice of particle allows control over the uptake of water and conversely over the release of toxin.

As the preferred particles are spheroidal in shape, they are expected to have a packing density of around 60%. Thus they are expected to show a Critical Pigment Volume Concentration of about 60%. Above this concentration the paint becomes underbound, meaning that there is insufficient paint to fill the spaces between the (relatively large) particles, and 'free voids' appear. The film thus becomes still more porous. However, this additional porosity leads to a less well 'trapped' aqueous phase inside the film. This will lead to a more rapid depletion of the toxin. While this may generally seem undesirable, it may be an advantage if all the toxin is intended to be released quickly. Such a case might arise where a hull is launched before fitting-out is complete. The vessel would consequently not travel and thus being stationary, probably in estuarine conditions, would be very susceptible to heavy fouling. An anti-fouling composition formulated to release all its toxin over the fitting-out period at an even rate would be the most economical use of toxin and save labour costs involved in cleaning the hull before the final painting is done after fitting-out is complete. In addition to providing the thixotropy necessary to allow very high wet film thicknesses to be applied, and also allowing a high degree of water absorption, it is thought that the particles provide a framework within the film that assists in reducing internal stresses, and hence helps maintain film integrity.

In practical formulations of erodable anti-fouling compositions based on polymerbound toxins, the erosion rate of the film is controlled not only by adjusting the composition of the resins, but also by balancing the water-reactivity of the particulates which are incorporated in the film. This is more fully described in U.K. Patent 1,457,590, granted to International Paints. Use of the particles described above can provide a framework which also serves to control the erosion rate of the whole film (as opposed to the hydrolysis rate of the resin itself) and so a further advantage of this invention is that for those erodable anti-fouling compositions, the formulator has at his disposal another formulating tool in addition to a means of applying the necessary thickness of paint in one coat.

The following examples serve to illustrate without limiting the scope of the invention. All sea-water immersion evaluations were performed according to the procedures laid down in Method 485.1 of Australian Standard AS1580. All examples are still on exposure, thus the results given are interim results only.

In all cases, the paints were made by stirring in the relevant particles immediately prior to application, solvent being added as needed. Note, however, that the paints described can also be produced in a factory well in advance of application by standard techniques.

EXAMPLE 1

A standard chlorinated rubber anti-fouling composition in which the vehicle is chlorinated rubber plasticised with both chlorinated paraffin and hydrocarbon resins, and which also contains a significant volume of rosin, and which further contains cuprous oxide and tri-butyl tin oxide as toxins in addition to other minor additives and solvents, to give a paint with 45% film-forming solids and a viscosity of about 5 poise, can be applied to a vertical surface at a wet-film thickness (WFT) of up to 250 micrometers corresponding to a dry film thickness (DFT) of up to 100 micrometers (microns). This paint is normally applied over an appropriate chlorinated rubber priming system of between 150 and 300 microns DFT. At 100 microns DFT, it is normally found that cracking in the anti-fouling coating appears after about four months immersion, or after a number of weeks exposure to the atmosphere and sunlight. The cracking is aggravated if the two types of exposure are cycled. Furthermore, as more coats are applied leading to a thicker film, cracking becomes more pronounced. At 200 microns DFT, a foul-free life of 24 months can be expected.

To this known anti-fouling composition, Q-cells were added by stirring until homogeneous at the rate of 80 g/liter (40% $^{v}/v$). A film of the resultant paint was applied over a vertically oriented PVC panel at a DFT of 600 microns in one coat using a pressure-pot conventional spray gun. After 18 months of immersion in sea-water, there is no sign of checking, cracking or erosion, nor is there any sign of settlement by marine fouling organisms.

EXAMPLE 2

An erodable anti-fouling paint, based on an acrylic resin which contains tri-butyl tin groups bonded to the backbone via an ester linkage as the binder, pigmented with zinc oxide and talc, and containing solvents and other minor additives to give a paint of 35% film-forming solids by volume, with a viscosity of 7.5 poise, can be applied to a vertical surface to a maximum WFT of 400 microns, leading to DFT of 140 microns. Normally such paints are applied in a three or four coat system (over a suitable priming system) to give a total DFT of 300 to 500 microns, which is expected to give a foul-free life of three years.

To such an anti-fouling composition, Q-cells were added at a rate of 80 g/liter (40% $^{v}/v$) by stirring. The resultant anti-fouling compositions could be applied to a vertical surface at a WFT of 700 microns (corresponding to a DFT of approx. 550 microns) in a single coat, using a pressure pot conventional spray gun. The material was thus applied to grit-blasted steel panels coated with either a chlorinated rubber, coal-tar epoxy or bituminous priming system. One panel of each of these systems was immersed in sea-water within 48 hours of the last coat being applied, while an identical set was exposed to the atmosphere for 6 weeks prior to immersion. After 12 months there is no growth of marine fouling organisms on any of the panels, nor any sign of cracking or erosion.

EXAMPLE 3

An anti-fouling composition consisting of calcium/-zinc rosinate modified with a non-volatile cyclic hydrocarbon and containing cuprous oxide as toxin as well as solvents and other minor additives is often applied over a suitable bituminous or oleoresinous priming system at a WFT of 200 microns (approx. 85 microns DFT), as a single coat, giving a year's protection against fouling. Such a soluble matrix is known to suffer from cracking and blistering if exposed to the atmosphere for more than 48 hours, either before or after immersion.

To such a conventional soluble matrix anti-fouling composition, Q-cells were added at a rate of 80 g/liter (40% v/v). The resultant paint was applied to a vertically oriented grit-blasted steel panel already coated with a suitable bituminous priming system. A WFT of 700 microns was obtained, corresponding to a DFT of approx. 550 microns. Such panels were both immersed in seawater and exposed to atmospheric sunlight. In the latter case, cracking did not appear until four weeks after application, while in the former 12 months, immersion in sea-water has not yet resulted in any fouling whatsoever.

EXAMPLE 4

In this example the known anti-fouling composition has an unmodified acrylic resin as binder, and contains significant quantities of both cuprous oxide and triphenyl tin hydroxide as toxins in addition to solvents and minor additives, and has 52% film forming solids by volume at a viscosity of 5 poise. The paint, when applied to vertically oriented panels previously coated with standard chlorinated rubber, pure epoxy, coal-tar epoxy or bituminous priming systems can be applied at DFT's of up to 200 microns in a single application giving up to 28 months foul-free life.

To such an anti-fouling composition, Q-cells were added at a rate of 80 g/liter (40% v/v) by stirring. The resultant composition was applied to a vertical, primed panel at a DFT of 600 microns in a single coat, using a pressure pot conventional spray gun.

Again, one panel was immersed in sea-water within 48 hours, while another was exposed to atmospheric conditions for 6 weeks before immersion. After 12 months there is no fouling or film defect on either panel.

EXAMPLE 5

In this example, the known anti-fouling paint has a vinyl resin as binder, along with a significant volume of rosin, and contains tri-butyl tin fluoride and thiuram as toxins. Such a paint, applied at a total of 150 microns DFT (in three coats) has been found to give 24 months protection against growth of marine fouling organisms.

To this paint were added Q-cells at a rate of 80 g/liter (40% v/v) with stirring. The resultant paint was applied to suitable primed, vertically oriented panels of marine ply at a WFT of 700 microns, yielding a dry film 550 microns thick. Such panels satisfactorily withstand exposure to immersion in sea-water for 12 months so far. Exposure to atmosphere for 5 months prior to immersion also does not appear to have had any ill effect.

EXAMPLE 6

The known anti-fouling composition used in Example 1 was again used, in this case Q-cells being added in such quantities to give seven (7) paints with Q-cell concentrations in the film-forming solids of 10, 20, 30, 40, 60, 70 and 80% v/v respectively. Extra xylene was added where necessary at a rate of up to 500 ml per liter of paint to facilitate both the incorporation of the Q-cells and the spray application.

These paints were applied to vertically oriented panels, previously coated with a primer, in a single spray application at 800 microns to give dry films between 400 and 600 microns. After 3 months immersion the panels coated with 10% and 20% v/v cells had begun to crack. No film defect or marine growth was detected on the remainder of the series.

EXAMPLE 7

To both the anti-fouling compositions described in Examples 2 and 4, Q-cells were added in such quantity as to produce paints containing Q-cell concentrations in the film-forming solids of 10, 40 and 80% v/v respectively. These six (6) paints were applied to vertically oriented primed panels in a single spray application to give wet films 800 microns thick, correspondingly the DFT's ranged from 400 to 600 microns. After three months exposure to marine conditions, no defects or growth are evident.

EXAMPLE 8

Examples 1 and 2 were repeated, using a commercial silica material instead of Q-cells. This material is a hydrophillic amorphous fumed silica, and thus has some chemical similarity to Q-cells, although its physical form differs vastly, it consisting of extremely small solid spheres, particle size well below 1 micron, with a density of 2.2 g/cc.

The paints thus made were readily applied at 700 microns WFT, yielding dry films of 350 to 400 microns.

Using the known anti-fouling composition as described in Example 1, incorporating the silica resulted, on drying, in severe 'crows-footing', a term used in the Surface Coating Industry to denote the presence of three cracks radiating from a common point in directions roughly at 120 degrees to each other. At 400 microns DFT this was so severe as to cause flaking, the cracks being up to 1 cm long and intersecting one another. Even at only 140 microns DFT, severe crows-footing is seen. Crows-footing is also present in the anti-fouling composition used in Example 2, after incorporation of the silica at only 40 g/liter at 350 microns DFT. This panel showed heavy cracking after only 1 month under immersed conditions.

Thus, purely providing sufficient thixotropy to allow application at UHB film thickness, by conventional means, does not yield the set of advantages attainable by means of this invention.

EXAMPLE 9

Examples 1, 2 and 3 were repeated, using hollow glass spheres made by 3M, having a density of approx. 0.2 and a particle size of 10 to 100 microns, in place of Q-Cells. The anti-fouling compositions, thus produced were readily applied to vertical panels at 700 microns WFT, giving dry films of 500–550 microns thick.

These films were found to be free from defects on drying. Panels coated with these paints satisfactorily resist exposure to sea-water immersion for 12 months so far, as well as 6 weeks exposure to atmospheric sunlight.

EXAMPLE 10

Examples 2 and 5 were repeated, using instead of Q-cells microballoons, a phenolic resin particle manufactured by the Union Carbide Corporation. These particles range in size between 5 and 125 micrometers and have a density of 0.21–0.25 g/cc. The anti-fouling compositions thus produced were applied to primed, vertical panels in a single spray application at a wet film thickness of 700 microns, to give dry films approx. 500 microns thick.

The paints thus produced were exposed to marine conditions and at 3 months no evidence of fouling is evident. Exposure to atmospheric conditions resulted in small surface cracks after 3 weeks in case of the composition of Example 5. The Example 2 analogue showed no cracking at 6 weeks.

I claim:

1. In a marine anti-fouling liquid paint composition containing resin, marine toxin and solvent, the improvement comprising hollow particles of glass or sodium borosilicate having substantially no internal porosity, a particle size of from 1 to 800 microns, an apparent bulk density of 0.1 to 0.5 g/cc, as measured by liquid displacement, and present in an amount sufficient to give a particle concentration in a dry film formed from the composition of from 10% to 80% by volume.

2. An anti-fouling composition as claimed in claim 1, wherein the hollow particles are hollow microspheres or microballoons.

3. An anti-fouling composition as claimed in claim 1, wherein the hollow particles are of glass.

4. An anti-fouling composition as claimed in claim 1, wherein the hollow particles have sizes in the range 5 to 300 microns.

5. An anti-fouling composition as claimed in claim 1, wherein the hollow particles are present in an amount of from 25% by volume of a dry film prepared from the composition, up to the amount where they are in contact in the dry film with the interstices just filled with the remaining ingredients of the composition.

6. An anti-fouling composition as claimed in claim 1, wherein the particles are substantially rigid.

7. An anti-fouling composition as claimed in claim 1, wherein the resin is slowly dissolved by water.

8. An anti-fouling composition as claimed in claim 1, wherein the resin is chemically bonded to the toxin by a bond which is slowly hydrolysed by water.

9. A method of protecting a substrate, consisting in applying to the substrate a single coating having a thickness of at least 300 microns of the anti-fouling composition of claim 1.

* * * * *